March 12, 1963  M. W. MARIEN  3,081,101
OIL CONTROL PISTON RING ASSEMBLY
Filed Dec. 22, 1958

Inventor
MELVIN W. MARIEN
by Hill, Sherman, Meroni, Gross & Simpson
Attys.

United States Patent Office 3,081,101
Patented Mar. 12, 1963

3,081,101
OIL CONTROL PISTON RING ASSEMBLY
Melvin W. Marien, Brentwood, Mo., assignor to Ramsey Corporation, St. Louis, Mo., a corporation of Ohio
Filed Dec. 22, 1958, Ser. No. 782,105
13 Claims. (Cl. 277—140)

The present invention relates broadly to oil control piston ring assemblies, and is more particularly concerned with an oil control ring and assembly having a sheet metal circumferential spacer and expander ring associated therewith constructed to provide improved oil ventilation, to prevent overlapping of the ends thereof during installation, and to permit the utilization of rail rings of reduced radial thicknesses.

It is an important aim of the present invention to provide a sheet metal circumferential spacer and expander ring for rail ring assemblies shaped in serpentine configuration and featuring a plurality of rail ring supporting members formed and disposed to permit maximum oil drainage through the spacer and expander ring.

Another object of the invention lies in the provision of an expander-spacer structure for oil control rings characterized by a plurality of circumferentially spaced rail ring supporting members generally U-shaped in cross-section and a plurality of circumferentially spaced loop members generally U-shaped in plan connecting said rail ring supporting members, whereby during installation of the expander-spacer structure overlapping of the supporting members is prevented by said loop members.

Another object of the present invention is to provide a spacing and expanding device for rail rings formed of a plurality of circumferentially spaced rail ring supporting and bearing portions each having a pair of axially spaced crowns or leg members provided at one end with tabs for urging the rail rings radially outwardly, each pair of leg members being connected in axially spaced relation by a bight or base segment, each segment having integral therewith a pair of loop members providing connection with adjacent circumferentially spaced rail ring supporting and bearing members to prevent an overlapping of said members during installation of the spacing and expanding device.

A further object of this invention lies in the provision of an expanding and spacing ring of the foregoing character, in which the connecting loops are of relatively greater radial length than the radial thickness of the rail rings to permit the utilization of the present ring in piston grooves of substantial depth without the likelihood of the rail rings jumping or slipping out of the groove during the installation process.

Other objects and advantages of the invention will become more apparent during the course of the following description, particularly when taken in connection with the accompanying drawings.

In the drawings, wherein like numerals are employed to designate like parts throughout the same:

Figure 1:
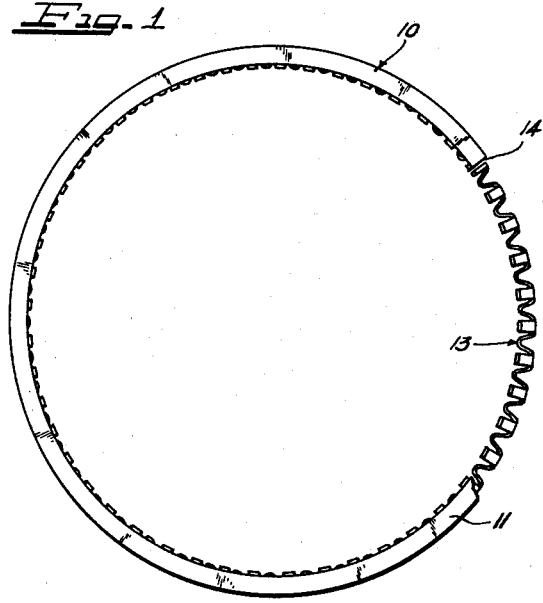
FIGURE 1 is a plan view of an oil control ring assembly according to the principles of this invention, with parts broken away to more clearly illustrate features thereof.

Briefly stated, a circumferential spacer and expander for oil control piston rings as constructed in accordance with the principles of this invention is formed from a strip of resilient material in a manner to provide circumferentially spaced connecting leg members of general U-shape in cross-section which bear axially and radially against a pair of rail rings, to thereby maintain the outer circumferential edges of the rail rings in sealing contact with the cylinder. Each of the leg members comprises a pair of relatively narrow axially spaced leg segments connected at their radial outward ends by a base segment, and the opposite or radial inward end of each leg segment has a tab portion formed thereon to urge the outer circumferential edge of each rail ring against the cylinder wall. The leg members are connected and maintained circumferentially spaced by loop members generally U-shaped in plan which connect with each leg segment generally midway of the height thereof. The leg members are accordingly prevented from overlapping during installation, and each loop member has a radial length greater than the radial depth of the rail rings to prevent dislodgment of the rail rings during installation. As is clearly shown in the drawings, and as will be brought out in detail hereinafter, the expander-spacer ring is substantially open so that increased oil drainage is obtained therethrough. Various other novel structural features of the present invention will become apparent as the description proceeds.

Figure 2:
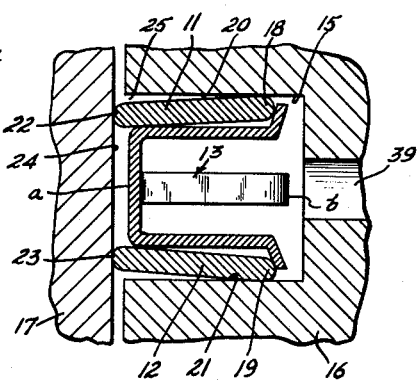
FIGURE 2 is a fragmentary sectional view of piston and cylinder structure, showing the oil control ring assembly of this invention located in an oil ring groove of the piston.

Referring now to FIGURES 1 and 2, an oil control ring assembly designated generally by the numeral 10 comprises a pair of relatively thin, split and expansible rail rings 11 and 12 arranged in axially spaced relation and backed for radial and axial expansion by a circumferential spacer and expander ring indicated in its entirety by the numeral 13. The rail rings are of known construction and generally are formed from a high chromium content steel, or may be chromium plated throughout or plated on only their outer peripheral edges.

The rail rings 11 and 12 are also commonly provided with a gap 14 extending through the radial width or thickness thereof to permit circumferential expansion and contraction of the rails, although this gap may be essentially zero so that the ends of the rail rings abut when the expander-spacer ring 13 is in a free state. The rail rings 11 and 12 are received throughout a major portion of their radial length or depth within a groove 15 provided in a piston 16 reciprocably received in a cylinder 17. By employment of an expander-spacer ring embodying the novel concepts of this invention, a generally axial force is applied to inner circumferential edge portions 18 and 19 of the rings to maintain an effective seal between said portions and surfaces 20 and 21 defining the axial depth of the groove 15 in the piston 16. In addition, a generally radially outward force is applied against the edge portions 28 and 29 to maintain an effective rubbing seal between outer circumferential edge portions 22 and 23 of the rail rings and inner face 24 of the cylinder 17. It may thus be seen that the expander-spacer ring 13 functions to dish the rail rings 11 and 12 outwardly and that normally a slight gap or opening 25 is present between the faces 20 and 21 defining the opening 15 and the rail rings slightly radially inwardly of the outer circumferential edge portions 22 and 23 of said rings. A biasing action accordingly occurs.

Figure 3:
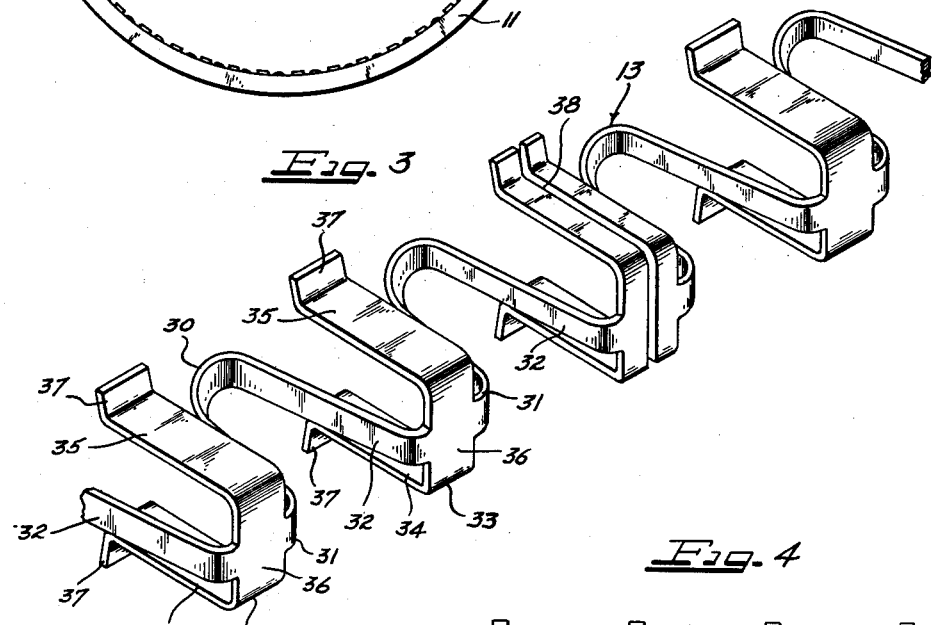
FIGURE 3 is a fragmentary isometric illustration of an expander and spacer ring embodying the novel concepts of this invention.
Figure 4:
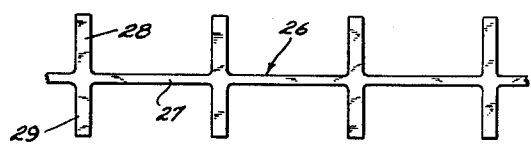
FIGURE 4 is a fragmentary plan view of a strip of metal as punched and prior to the formation therefrom of the expander-spacer ring of this invention.

To accomplish the dishing or biasing action described, the circumferential spacer and expander ring 13 is formed in the manner of FIGURE 3 from a blank of the character illustrated in FIGURE 4. With reference first to the latter view, a blank 26 generally H-shaped in plan is provided having a central longitudinally extending cross-member 27 connecting at opposite ends with a pair of transverse leg members 28 and 29. It is to be seen that the transverse members 28 and 29 are of relatively greater width than the longitudinal cross-member 27, although this may of course be varied, and that the cross-member 27 is of substantial length so that when formed it will be of greater radial length than the transverse members 28 and 29 as formed. The blank 26 is preferably constituted of a resilient oil resistant material, and various of the stainless steels are suitable for this purpose. As is appreciated, the blank 26 would normally be punched or otherwise cut from a generally rectangular stock piece.

To form the blank 26 into the shape of FIGURE 3, the longitudinal cross-members 27 are rolled or bent into a smoothly curved U-shape as viewed in plan, thereby providing a connecting leg member 30. As is now apparent, the longitudinal cross-member 27 of the blank 26 is bent generally centrally of the length thereof so that each connecting leg member 30 has leg segments 31 and 32 of generally equal length. To provide the members supporting the rail rings 11 and 12, each transverse leg member 28 and 29 of the blank 26 is bent inwardly of the opposite ends thereof in a right angular manner, the members 28 and 29 when so formed providing a rail ring supporting member 33 essentially U-shaped in cross-section and comprising a pair of axially spaced leg or crown portions 34 and 35 connected at their radial inward ends by an axial spacer or vertical segment 36. The inner radial end of each leg portion 34 and 35 may then be turned in a generally inclined vertical direction to provide a tab 37 thereon.

It will now be seen upon reference to FIGURES 2 and 3 that the leg portions 34 and 35 of each supporting leg member 33 are axially spaced by the base segment or bight 36 and extend therefrom radially inwardly in generally parallel relation one to the other. The leg portions 34 and 35 are of essentially the same radial length, and as compared to the rail rings 11 and 12 are of relatively lesser radial length. The connecting leg or loop members 30 are generally in horizontal alignment with one another, and when the expander-spacer ring 13 is viewed in the installed position of FIGURE 2, the connecting leg members 30 are seen to lie generally parallel with the support leg portions 34 and 35 and to be axially spaced generally midway between said leg portions 34 and 35. Further, it is to be seen that the rail ring supporting members 33 open radially inwardly, while the connecting loop members 30 open radially outwardly. In addition, the leg portions 34 and 35 of each supporting leg member 33 are axially or vertically spaced one from the other, while the leg segments 31 and 32 of each loop member 30 are horizontally or circumferentially spaced one from the other, and accordingly, it may be considered that the axis of the loop members 30 is disposed 90° from the axis of the support leg members 33. The expander-spacer ring 13 may thus be seen to comprise a plurality of alternating horizontal corrugations or convolutions 30 and alternating vertical corrugations or convolutions 33.

The expander and spacer ring structure 13 may be split as indicated at 38 in FIGURE 3, so that the end edges either abut or stand slightly open when the ring 13 is in its free state. When installed in the proper position with respect to the rail rings 11 and 12, as shown in FIGURE 2, the resilient leg portions 34 and 35 of each support leg member 33 maintains the rail rings 11 and 12 in axially spaced relation, and the tab portion 37 on each of said leg portions 34 and 35 exerts a radially outward force on the inner circumferential edge portions 18 and 19 of said rings to maintain the outer circumferential edge portions 22 and 23 of the rail rings in rubbing and sealing contact with the cylinder wall surface 24. By action of the axial and radial force provided by the expander-spacer ring 13, the rail rings 11 and 12 are biased or dished essentially as is seen from FIGURE 2. During reciprocation of the piston 16 oil is wiped and enters the piston groove 15, being ported therefrom through drain holes 39 in said piston. Since the rail ring support members 33 and the connecting loop members 30 are of minimum dimensions and of open construction, and since the supporting leg members 33 are circumferentially spaced with respect to one another as well as to the connecting leg members 30, there is minimum impedance or interference to a smooth oil flow through the piston ring groove 15 and outwardly through the drain hole 39. The essentially open construction of the expander-spacer ring of this invention is accordingly free flowing and increased oil drainage or ventilation is obtained therefrom.

In addition, the difficulty heretofore encountered with expander-spacer ring structures of the connecting loop portions, as well as the ends of the ring structure, becoming nested or overlapped during installation is herein avoided. Specifically, during expansion of the ring 13 during the installation process the rail ring support members 33 continuously maintain the loop members 30 in circumferentially spaced relation, and the opening or axial space between the leg portions 34 and 35 of the support leg members 33 permits movement of the loop members 30 into relatively closely spaced circumferential relation without the likelihood of the loop members nesting or lapping over one another. It is thus to be seen that the loop members 30 during any condition of expansion or contraction of the ring 13 remain sufficiently circumferentially spaced to avoid interference one with the other.

The present structure has the further advantage that the rail ring radial depth or length may be substantially reduced, and the advantages obtained of increased flexibility in rail ring design and improved mating or conformability of the rail ring with the piston ring groove surfaces. And yet, at the same time, the circumferential expander-spacer of this invention may be effectively employed in grooves of substantial radial depth without the likelihood that the rail rings will jump or spring out of the groove as the installation is being performed. This is herein accomplished by providing loop members 30 of relatively greater radial length than the radial length or depth of the rail rings 11 and 12. Referring particularly to FIGURE 2, the radial length of the loop member 30 as measured from the radial outward face of the axial spacer 33, or from the point "a," to the radial inward face or point "b" of the loop member 30 is greater than the radial length of each rail ring as measured between the outer and inner circumferential edge portions 22 and 18 or 23 and 19. Accordingly, the loop members 30 extend radially inwardly of the tabs 37 on the leg portions 34 and 35 and relatively more closely to the bottom of the groove 15 than do said tabs 37. By this construction, a more balanced axial force is applied against the rail rings 11 and 12, and the likelihood of said rings being resiliently urged radially outwardly by the tab portions 37 is rendered essentially remote, even when the depth of the groove 15 is extended substantially beyond that shown.

Each of the foregoing factors mutually contribute to provide an expander and spacer ring construction which functions effectively in a wide variety of installations. Improved oil drainage is obtained therefrom, and the mentioned difficulty of overlapping associated with installation of the conventional structure is avoided. Further, the oil control piston ring assembly of this invention may be fabricated of relatively low cost spring metals by high speed production techniques, and may be rapidly located in the desired position without resort to special installation tools.

It is to be understood that various modifications may be effected in the ring structure herein disclosed without departing from the novel concepts of the present invention.

I claim as my invention:

1. In a piston ring assembly including a pair of thin rail rings, the improvement which comprises an expander-spacer ring between the rail rings comprising a plurality of circumferentially spaced resilient portions supporting the rail rings and urging the same axially and radially with respect thereto, and a plurality of circumferentially spaced resilient portions connecting the supporting portions and spaced axially between the rail rings free of direct contact therewith.

2. In a piston ring assembly including a pair of thin rail rings, the improvement which comprises an expander-spacer ring between the rail rings comprising a plurality of circumferentially spaced resilient portions supporting the rail rings and urging the same axially and radially with respect thereto, means on said resilient portions engaging the inner peripheries of the rail rings to expand said rings, and a plurality of circumferentially spaced resilient portions connecting the supporting portions, the supporting portions being generally U-shaped in cross section and the connecting portions being generally U-shaped in plan.

3. In a piston ring assembly including a pair of thin rail rings, the improvement which comprises an expander-spacer ring between the rail rings comprising a plurality of circumferentially spaced resilient portions supporting the rail rings and urging the same axially and radially with respect thereto, and a plurality of circumferentially spaced resilient portions connecting the supporting portions, the supporting portions being generally U-shaped in cross-section and opening radially inwardly and the resilient connecting portions being generally U-shaped in plan and opening radially outwardly.

4. In a ring assembly for pistons including axially spaced seal rings, the improvement which comprises an expander-spacer ring between the seal rings having axially spaced leg portions supporting the seal rings and urging said rings axially and radially with respect thereto, a leg segment connecting the leg portions and maintaining the same axially spaced and resilient arm members connecting with each leg segment between opposite ends thereof circumferentially spacing the leg segments one from the other.

5. In a ring assembly for pistons including axially spaced seal rings, the improvement which comprises an expander-spacer ring between the seal rings having axially spaced leg portions supporting the seal rings, lips on the inner peripheries of the leg portions engaging the inner peripheries of the seal rings to expand the same, a leg segment connecting the leg portions and maintaining the same axially spaced, and resilient arm members connecting with each leg segment between opposite ends thereof circumferentially spacing the leg segments one from the other.

6. In an oil seal ring assembly which includes a cylinder, a piston having at least one oil ring groove and movable in the cylinder, and a pair of oil rings in said groove in sealable relation with the cylinder, the improvement which comprises an expander-spacer ring between said oil rings, the expander-spacer ring comprising a plurality of circumferentially spaced oil ring supporting members bearing axially and radially thereagainst, and a plurality of circumferentially spaced loop members connecting said supporting members along one end thereof and spaced axially from and between said members.

7. In an oil seal ring assembly which includes a cylinder, a piston having at least one oil ring groove and movable in the cylinder, and a pair of oil rings in said groove in sealable relation with the cylinder, the improvement which comprises an expander-spacer ring between said oil rings, the expander-spacer ring comprising a plurality of circumferentially spaced and axially expansible oil ring supporting members bearing radially against said oil rings, and a plurality of circumferentially spaced and circumferentially expansible loop members connecting said supporting members along one end thereof and spaced axially between the oil rings.

8. In an oil seal ring assembly which includes a cylinder, a piston having at least one oil ring groove and movable in the cylinder, and a pair of oil rings in said groove in sealable relation with the cylinder, the improvement which comprises an expander-spacer ring between said oil rings, the expander-spacer ring comprising a plurality of circumferentially spaced leg members generally U-shaped in cross-section supporting the oil rings and bearing axially and radially thereagainst, and a plurality of circumferentially spaced members connecting the leg members along the bases thereof and being generally U-shaped in plan, the leg members opening radially inwardly and the connecting members opening radially outwardly free of direct contact with the oil rings.

9. In an oil seal ring assembly which includes a cylinder, a piston having at least one oil ring groove and movable in the cylinder, and a pair of oil rings in said groove in sealable relation with the cylinder, the improvement which comprises an expander-spacer ring between said oil rings, the expander-spacer ring comprising a plurality of circumferentially spaced leg members generally U-shaped in cross-section supporting the oil rings and bearing axially and radially thereagainst, each of the leg members having a lip on the inner periphery thereof engaging the inner periphery of each of the oil rings to expand the same, and a plurality of circumferentially spaced members connecting the leg members along the bases thereof and spaced axially from and between the oil ring supporting portions of the leg members and being generally U-shaped in plan, the leg members opening radially inwardly and the connecting members opening radially outwardly.

10. In an oil seal ring assembly which includes a cylinder, a piston having at least one oil ring groove and movable in the cylinder, and a pair of oil rings in said groove in sealable relation with the cylinder, the improvement which comprises an expander-spacer ring between said oil rings, the expander-spacer ring comprising a plurality of circumferentially spaced leg members generally U-shaped in cross-section supporting the oil rings and bearing axially and radially thereagainst, and a plurality of circumferentially spaced members connecting the leg members along the bases thereof and being generally U-shaped in plan, the radial length of each connecting member being relatively greater than the radial length of the oil rings to avoid dislodgment of said rings from the groove during their installation.

11. In an oil seal ring assembly which includes a cylinder, a piston having at least one oil ring groove and movable in the cylinder, and a pair of oil rings in said groove in sealable relation with the cylinder, the improvement which comprises an expander-spacer ring between said oil rings, the expander-spacer ring comprising a plurality of vertically disposed corrugations supporting the oil rings and urging said rings axially and radially with respect thereto, and a plurality of horizontally disposed corrugations intermediate and connecting therewith, the vertical corrugations preventing overlapping of the horizontal corrugations during installation of the expander-spacer ring between the oil rings and the horizontal corrugations being free of direct contact with said oil rings.

12. An expander and spacer ring for oil control rings, which comprises a plurality of circumferentially spaced bridge members of general hair pin shape, and a plurality of circumferentially spaced oil control ring supporting members generally U-shaped in cross-section connecting with said bridge members at opposite ends thereof, the bridge members being disposed generally midway of the axial height of the supporting members and generally horizontally aligned one with the other, each of said supporting member having a lip on the free ends thereof for engagement with the edges of the oil control rings to expand the same.

13. An expander and spacer ring for oil control rings, which comprises a plurality of circumferentially spaced bridge members of general hair pin shape, and a plurality of circumferentially spaced oil control ring supporting members generally U-shaped in cross-section connecting with said bridge members at opposite ends thereof, the bridge members being disposed generally midway of the axial height of the supporting members and generally horizontally aligned one with the other, each of said supporting member having a lip on the free ends thereof for engagement with the edges of the oil control rings to expand the same, the closed portion of each bridge member extending outwardly beyond the supporting member lips to prevent dislodgment of the oil control rings from the piston groove during installation therein.

References Cited in the file of this patent
UNITED STATES PATENTS
2,744,803   Marien _____ May 8, 1956